United States Patent [19]

Tang et al.

[11] Patent Number: 5,025,314
[45] Date of Patent: Jun. 18, 1991

[54] APPARATUS ALLOWING REMOTE INTERACTIVE USE OF A PLURALITY OF WRITING SURFACES

[75] Inventors: John C. Tang, Palo Alto; Scott L. Minneman, San Francisco, both of Calif.

[73] Assignee: Xerox Corporation, Stamford, Conn.

[21] Appl. No.: 559,486

[22] Filed: Jul. 30, 1990

[51] Int. Cl.⁵ .............................................. H04N 7/18
[52] U.S. Cl. ....................................... 358/93; 178/18
[58] Field of Search ..................... 358/93, 108, 84, 83, 358/85, 496, 494, 487; 178/18, 19, 20; 434/307, 323, 322

[56] References Cited

U.S. PATENT DOCUMENTS

| | | | |
|---|---|---|---|
| 3,617,630 | 11/1971 | Reiffel | 178/19 X |
| 3,755,623 | 8/1973 | Cassagne | 178/7.89 |
| 4,280,135 | 7/1981 | Schlossberg | 358/93 |
| 4,371,893 | 2/1983 | Rabeisen | 358/93 |
| 4,400,724 | 8/1983 | Fields | 358/85 |
| 4,561,017 | 12/1988 | Greene | 358/93 |

FOREIGN PATENT DOCUMENTS 0347725 12/1988 European Pat. Off. .

Primary Examiner—Victor R. Kostak

[57] ABSTRACT

Remote interactive use of a plurality of writing surfaces, such as special wall mounted whiteboards and the like, is facilitated by an apparatus which includes, for each writing surface, a translucent screen acting as the writing surface itself, a video camera located behind the translucent screen for receiving an image of indications imparted upon the translucent screen, and a video projector for projecting onto the back side of the translucent screen a composite of the images imparted upon each of the translucent screens. Backlighting of a user is employed to allow presentation of the processes of imparting, using and referring to the indicia together with the indicia itself. Proper ambient lighting also provides a limited three dimensional view of the user. Audio portions of interactive work may be captured by a microphone and transmitted to speakers in conjunction with the video portion of the interactive work. An audio/video mixing resource may be employed to combine the images of indicia and audio from various worksites for presentation. Low bandwidth of the present system facilitates compression and use with emerging commercial communications standards (e.g., ISDN).

12 Claims, 4 Drawing Sheets

APPARATUS ALLOWING REMOTE INTERACTIVE USE OF A PLURALITY OF WRITING SURFACES

BACKGROUND OF THE INVENTION

The present invention relates generally to communication devices. More specifically, the invention relates to interactive devices presenting real-time audio and video images for facilitating remote collaboration between users.

The nature of the modern workplace has reached a point where two or more collaborators can work independently yet simultaneously on the same creation while being physically separated from one another. This is often required when the two or more collaborators are at different worksites, separated by small or even great distances. Such a situation will generally be referred to as "remote collaboration", and because some system is usually employed to facilitate such remote collaboration, each collaborator will generally be referred to as a "user" of such a system.

We have observed that collaboration, in general, often involves creating and referring to text and graphics. The created text and graphics generally must be shared by each collaborator. This sharing may be facilitated by a system which provides what will be called hereinafter a "shared workspace." Working without a shared workspace can limit collaboration by: (1) limiting the common understanding about a thing, task, etc., being referred to, (2) limiting the ability of one collaborator to visually add to or comment on the work of another collaborator, (3) causing significant delays in the stream of communication between collaborators, etc. Furthermore, we have observed that collaborators in general need to have an adequate awareness of each other in order to interact effectively. We have found that when collaborators work together in a shared workspace, the collaborators need to see not only the textual and graphic marks that are made, but they must also pay attention to the process of making, referring to, and using those marks, and must be contemporaneously aware of the markings and the person making those markings. Seeing this process helps the collaborators interpret the marks, retain the information presented, mediate their interaction, etc.

There exists in the art a number of devices or systems allowing or facilitating various degrees of use of a shared workspace. Some, for example, allow remote users only to view the workspace. For example, U.S. Pat. No. 3,755,623, issued to Cassagne, discloses a video system allowing presentation of an image of a document or the like which may be referred to by the user that includes a portion of the user, such as one or both hands, gesturing in relation to the document. Other users are presented with a view of the document. However, only the participant who has the document can gesturally refer to it, the other collaborators cannot enact their gestures with respect to the document.

Another reference presenting images of both a user and a document or the like, and allowing some degree of interactive use of the document, is U.S. Pat. No. 4,400,724 issued to Fields. This reference discloses a video teleconferencing system wherein a number of conferees can interactively communicate via a plurality of interconnected monitors and cameras. A document (paper or otherwise) is imaged by a video camera suspended above a "target area" where the document is located. Likewise, gestures relating to the document made within the target area are imaged by the same video camera. The images are presented on the monitors of the other conferees. The other conferees may modify the image by marking over their own target areas or refer to the image by gesture in the appropriate locations in their own target area. The composite of the document's image, modifications, and gestures is distributed for viewing by the conferees on their monitors, which are physically separate from their target areas, in real-time.

Also disclosed in the art are certain systems designed to capture and transmit less than the entire image of a user to a remote location. For example, the work of Myron Kruger on "Videoplace", as described in *Artificial Reality*, Addison-Wesley (1982), demonstrates a system which captures the outline of a user, and allows computational use of the data about the outline, such as drawing with a finger tip in free space, etc.

We have determined that a number of disadvantages exist in present devices or systems of the type discussed above. First, the devices or systems are of unique or unusual configuration and operation. This requires special skill and training for users, such as learning to draw in one location while viewing the consequences of that action in another. What is desired is a device or system which is simple to operate and similar to existing devices or systems so that the need for training is minimized or obviated.

Second, in general in the art there are no devices having writing surfaces which coincide with the viewing surfaces for all users. This disparity between input (writing) location and output (viewing) location can make it unnatural or difficult to collaboratively construct and use a drawing. What is desired is a system in which the writing and viewing surfaces coincide to allow shared marking directly on the presented image.

Third, many of the devices or systems previously known provide a relatively small workspace. We have determined that the relatively small screens used, combined with the line width of markers used in the systems, the limited resolution of the transmission and display of the marks by video and the scale of the user's hands in relation to the available screen space all limit the amount of work that can be accomplished before effectively filling up the screen. What is therefore desired is a system of the type described above having a larger workspace than previously available.

Fourth, the ergonomics of the devices or systems presently available impede efficient, comfortable, and accurate use. We have determined that users had to position themselves close to an upwardly facing horizontally oriented work surface while at the same time preventing their heads from blocking the overhead video camera's view of the drawing surface. To avoid blocking the camera's view, users' heads need to be off to one side of the drawing space. What is therefore desired is a system of the type described above having ergonomics which facilitate, rather than impede, the comfortable and accurate use of such a device or system.

Fifth, the disclosed devices or systems which capture the outline of a user require computational technology to produce an image of the user. This computational technology is costly in time of processing, size of required device and cost of required device. Further, this type of computational environment also has the problem where the input, interacting in "space", and the output, displayed on a monitor, are always separated (similar to the second problem discussed above). Finally, computational technology, based on image features and gross outlines, removes resources (e.g., shading, perspective, occlusion, etc.) present in video images which provide a valuable source of information to a viewer, such as proximity, depth perception, etc. What is therefore desired is a system of the type described above which minimizes or obviates the need for computational technology, allows input and output on the same work surface, and captures and presents for use information about three dimensional activity of the user.

Sixth, those devices or systems that transmit full video signals require high bandwidth transmission between the user's sites. This may be prohibitively expensive and render unsatisfactory images when transmitted according to developing standard communication protocols such as ISDN, or used with common data compression schemes, etc. What is therefore desired is a system of the type described above having a more limited transmission bandwidth requirement than previously available. The above disadvantages, together with a number of additional disadvantages of the existing and disclosed devices or systems has led to the present invention.

SUMMARY OF THE INVENTION

One aspect of the present invention is the provision of a novel video apparatus allowing remote interactive use of a plurality of writing surfaces. This video apparatus overcomes the above disadvantages, and others, by providing a plurality of writing surfaces, such as wall mounted whiteboards and the like, including, for each writing surface, a translucent screen acting as the writing surface itself, a video camera positioned to view the back side of the translucent screen for receiving an image of indicia, or equivalently markings, imparted upon the translucent screen, and a shadow of the user making and gesturing in relation to the indicia, and a video projector for projecting onto the back side of the translucent screen the imparted indicia and shadows upon each of the other translucent screens.

The configuration of the apparatus according to this aspect of the invention is such that no special training or skills are required for operation. While many physical arrangements of the device are contemplated by the descriptions contained herein, one convenient arrangement is similar to that of a conventional "whiteboard" (a device similar to a chalkboard, comprising a porcelain layer on a metal backing, melamine on hardboard backing, etc., and using dry erasable markers). The device may be wall mounted or positioned on an easel, although wall mounting provides a convenient arrangement. The size of the apparatus may be easily varied, but a large format such as three feet by four feet provides for convenient easy use. The use of the apparatus is identical to that of a standard whiteboard. A user simply marks or erases on the screen as if it were a whiteboard. The markings are transmitted to each projector, other than the user's own, for viewing. When a user desires to refer by gesture to some portion of the markings, he does so and the apparatus automatically transmits the gestures to the appropriate projectors for viewing.

Another aspect of the present invention is that it conveys an image of the other collaborator that includes not only the hands and arms but, in one or more embodiments of the present invention it includes also the head and most of the upper body. This greater view of the collaborator conveys more "body language" cues that can be used to mediate interaction between collaborators.

A further aspect of the present invention is that the indicia and the image of the collaborators are displayed on the same surface. This avoids a division of attention that can occur in known devices (and even in face-to-face interaction) where collaborators must alternate between looking down at the drawing surface and looking up at their collaborators. Furthermore, the above mentioned video camera is set with its focus at the rear surface of the translucent screen. Thus, marks made on the screen may be captured by the camera. However, the screen type and camera focus are selected to allow shadows falling on the screen also to be captured by the camera. Thus, a light source is positioned behind the user in such a fashion that an appropriately scaled shadow is cast onto the screen, captured by the video camera, and transmitted to each projector for viewing. In this way, the processes of imparting, using and referring to the indicia, together with the indicia itself, are presented for viewing.

A further aspect of the present invention is the provision of an apparatus having a large format allowing for a relatively large workspace. As discussed above, the size of the apparatus may be varied to accommodate specific applications. However, one application anticipated by the present invention is a large format screen resembling a whiteboard and having ample working space. In this way, the disadvantage of workspace size presented in the prior art is overcome.

Yet another aspect of the present invention is the provision of an apparatus designed for efficient, comfortable, and accurate use. The provision of an apparatus similar in configuration and use to a conventional whiteboard allows a user to impart markings thereupon without craning to avoid overhead cameras and the like. In fact, with the present invention, it is virtually impossible to block the optical path of the camera with either the hands or head of the user. Further, the above arrangement allows a user to mark on the screen at eye level. This obviates many parallax problems present in the above-mentioned art.

Still another aspect of the present invention is the provision of a system based entirely on audio and video technology and, at the same time, amenable to low bandwidth transmission. No computational elements are required, although they may be integrated into a system of the type described herein in appropriate circumstances. By relying on video technology, indicia and/or actions are transmitted between users and may be displayed essentially contemporaneously with their making, facilitating real time collaboration. By providing a surface, such as the aforementioned screen, upon which both the video camera and projector are focused, input and output from the system coincide. Finally, the backlighting of the user to thereby cast a shadow of the user on the screen provides a sense of depth based on contrast and focus, without actually capturing a full three dimensional image. By so limiting the data that needs to be exchanged, a relatively low bandwidth signal may carry the necessary amount of data, thus facilitating data compression and use of emerging commercial communications standards (e.g., ISDN).

An additional aspect of the present invention is the provision of a system of the above-described type able to accept and utilize a video mixing resource in appropriate applications. For example, when a plurality of writing surfaces are to be interconnected for interactive collaboration the video mixing resource may be connected at the hub of the interconnections. Also, prestructured indicia, such as the markings from a previous meeting, blank forms, etc., may be broadcast from the video mixing resource to each projector. In such a case, an external source of such prestructured indicia would also be integrated into the system. Furthermore, recording means may be employed to record the remote collaboration from, for example, the mixing resource.

Still another aspect of the present invention is the combination of a system of the type described above together with an audio communication system to allow both visual and audio information to be exchanged between users. By proper selection of an audio communication system the above-mentioned low bandwidth transmission abilities may be provided.

The scope of the present invention and the manner in which it addresses the disadvantages and limitations associated with the prior art will become more readily apparent from the following detailed description when taken in conjunction with the accompanying drawings and claims.

DETAILED DESCRIPTION

A novel apparatus allowing remote interactive use of a plurality of writing surfaces employing the aspects listed above, as well as others, will now be described. The following description will be primarily in terms of an embodiment particularly well suited to addressing all of the above-mentioned disadvantages and limitations, with variations and other embodiments discussed where appropriate. It will be appreciated, however, that the spirit and scope of the present invention encompass many other embodiments and applications. Thus, the following description is limited only for the purposes of clarity and conciseness, and should not be read as limiting the scope of the present invention.

Figure 1:
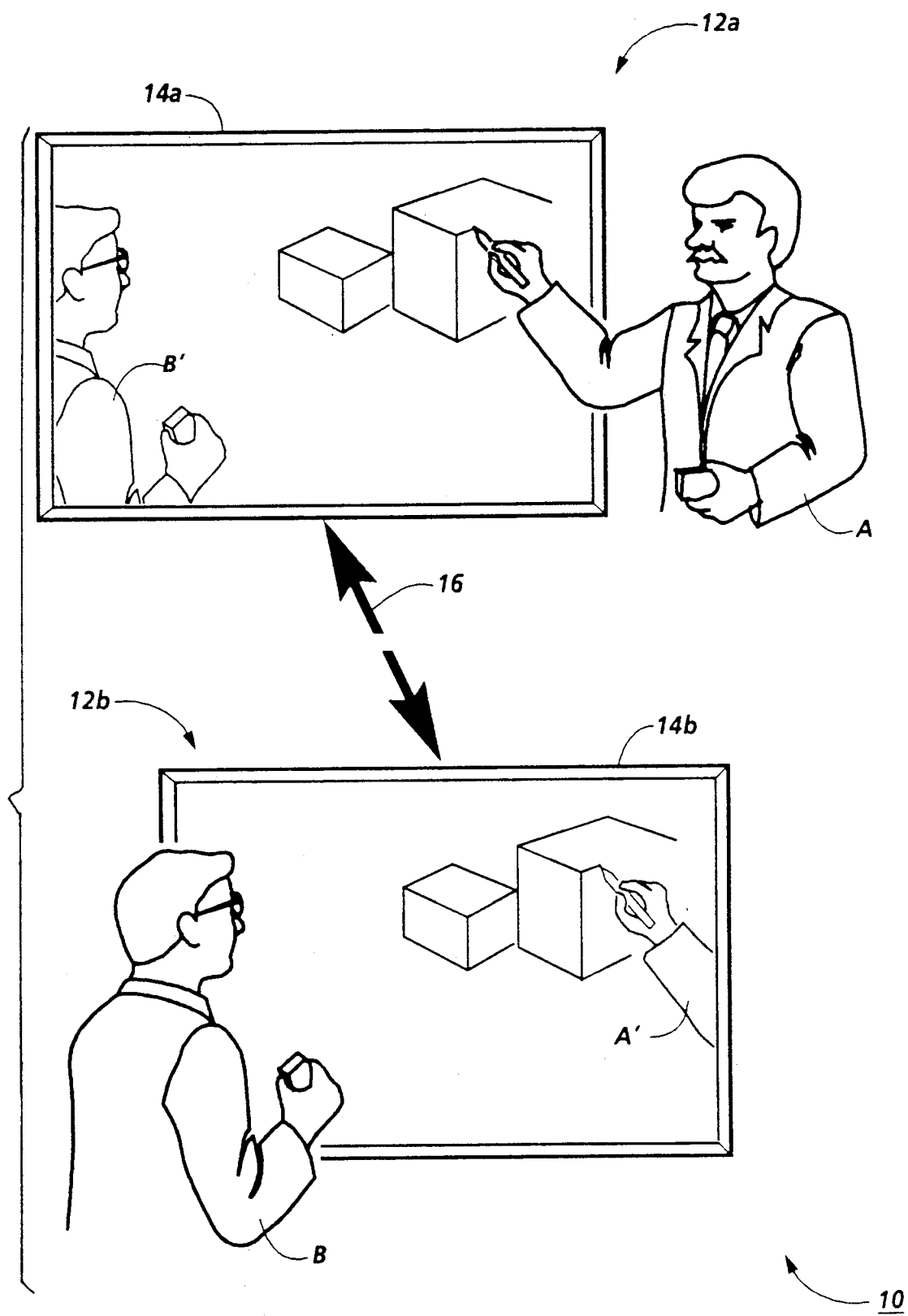
FIG. 1 is an illustration of one arrangement of an apparatus allowing remote interactive use of a plurality of writing surfaces according to the present invention, including two users, showing the invention in use.

Referring to FIG. 1, a system 10 for remote collaboration according to the present invention is illustrated in use. The illustrated system includes two users, A and B, although any number of users could of course be included. User A and user B will be assumed to be separated from one another, for example in conference rooms of two different buildings. Each user is shown near an apparatus, 12a and 12b, respectively, each apparatus comprising, inter alia, a screen 14a and 14b, respectively. Although two apparatus are shown and described, use of any number of such apparatus in a system according to the present invention is clearly anticipated by the present invention. Apparatus 12a and 12b are interconnected by appropriate means described further below, as represented by the double arrow 16.

In use, either user may impart indicia upon his corresponding screen 14a or 14b. In this case, user A is shown in the process of creating a figure on his screen. The tools user A may use to impart indicia upon screen 14a will depend on the material screen 14a is composed of, the nature of the collaborative effort, etc. Typically, a dry erasable marker will be used, such as Sanford Expo ® brand, or the like, to allow cleaning and remarking of the screen. As will be noted, not only are the imparted indicia viewable by user B, both the process of imparting the indicia and a portion of user A are also viewable. The portion of the user presented for viewing is in the form of a shadow, indicated as A' for the shadow of a portion of user A (and, similarly, B' for the shadow of a portion of user B). This provides much usable information to user B, and greatly facilitates the collaborative effort. User B may at any time add to the information presented on screens 14a and 14b. User B would simply mark on his screen 14b and by so doing add to or modify the presented indicia. Apparatus 12b would detect markings and shadow imparted by user B and transmit them for presentation on user A's screen 14a.

Figure 2:
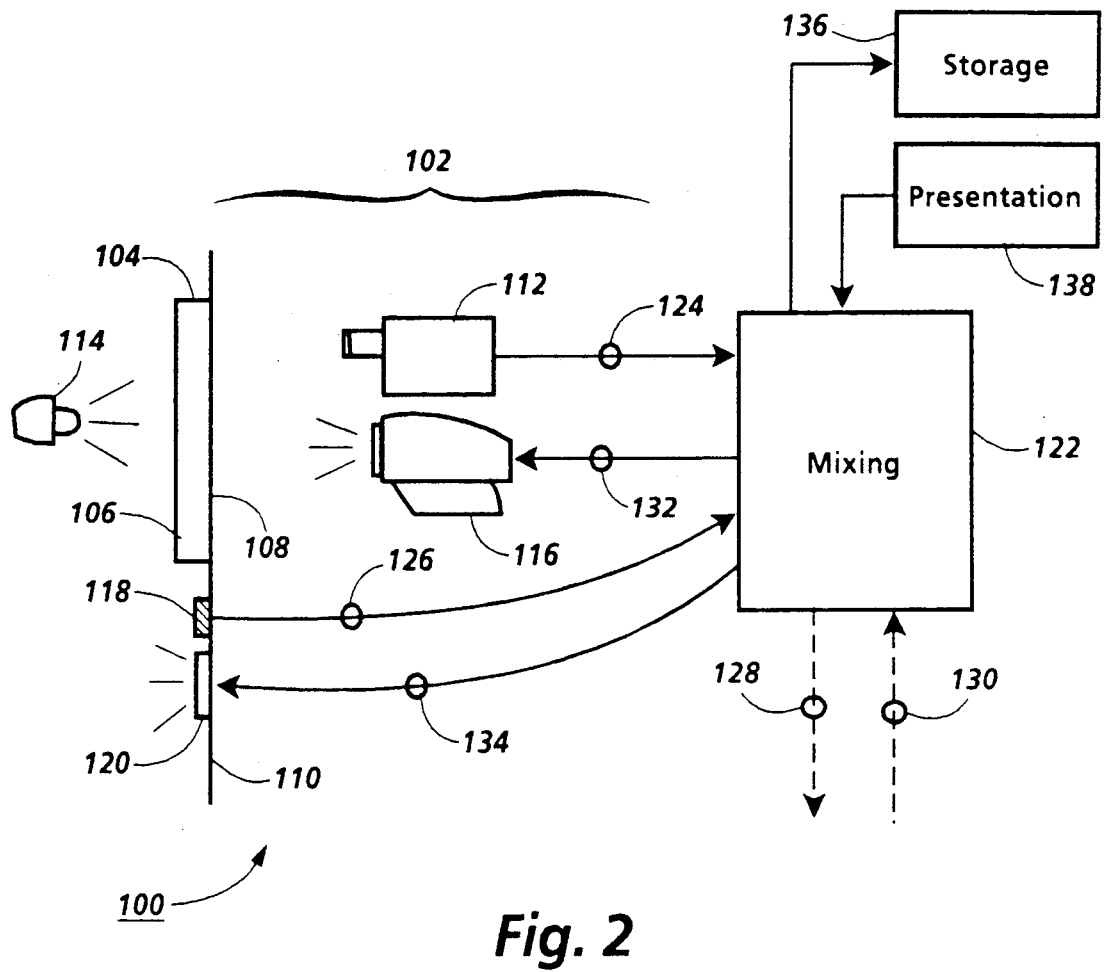
FIG. 2 shows an arrangement of an apparatus allowing remote interactive use of a plurality of writing surfaces, including signal mixing, according to one aspect of the present invention.

A generic system 100, of which system 10 of FIG. 1 is one example, will now be described in further detail with regard to FIG. 2. System 100 includes two or more apparatus, such as that shown in FIG. 1 at 12a and 12b. Such an apparatus will, for this description, be generically referred to by the reference numberal 102. Apparatus 102 comprises a writing/display screen 104, having first and second surfaces 106 and 108, respectively. For purposes of illustration, screen 104 is shown mounted to a wall surface 110. The appearance of screen 104 from a first side, facing the first surface 106, will be very much like a conventional whiteboard. One slight difference might be that surface 106 could have a translucent appearance, as opposed to the opaque appearance of a conventional whiteboard. However, first surface 106 will be smooth and of a quality for accepting marking thereupon. Keeping with the above aspects of the present invention, a number of disadvantages presently found in the art are overcome by styling the system as closely as possible after a conventional whiteboard. Thus, first surface 106 would be of a nonporous material capable of accepting markings from a dry erasable marker such as a Da-Glas Picture Window Screen modle DA-1N/250 GL, 58×74, from the Da-Lite Screen Company, Inc., of Warsaw, Ind.

On the opposite side of screen 104 from first surface 106 is second surface 108. Referring to FIGS. 2a through 2c, first and second surfaces 106, 108 may be two sides of a single sheet, as shown in FIG. 2a, or may be sides of separate sheets, as shown in FIGS. 2b and 2c. Importantly, light must be able to travel in a coherent manner from one to the other without undue attenuation, for it is light transmitted from the second surface 108 to the first surface 106 that allows a user to see projected images as markings and shadows on his apparatus, and light transmitted from the first surface 106 to the second surface 108 that allows markings on the first surface 106 to be captured and subsequently projected to other apparatus.

Figure 3A:
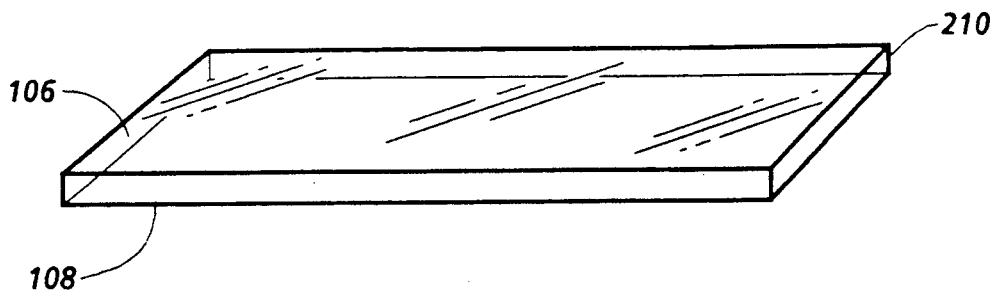
FIGS. 3a through 3c show three possible arrangements of writing/display screens according to the present invention.
Figure 3B:
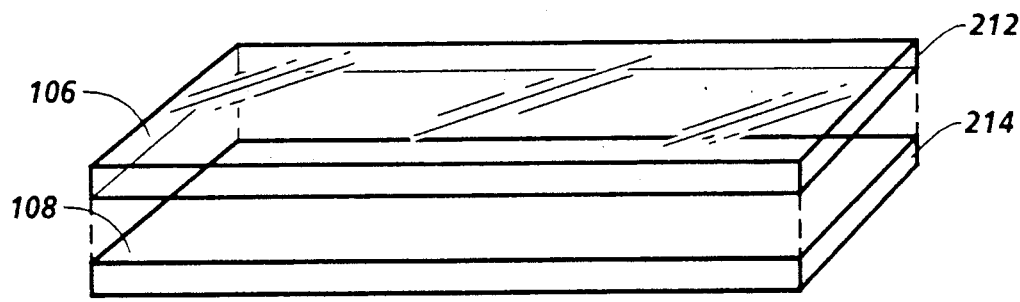
Figure 3C:
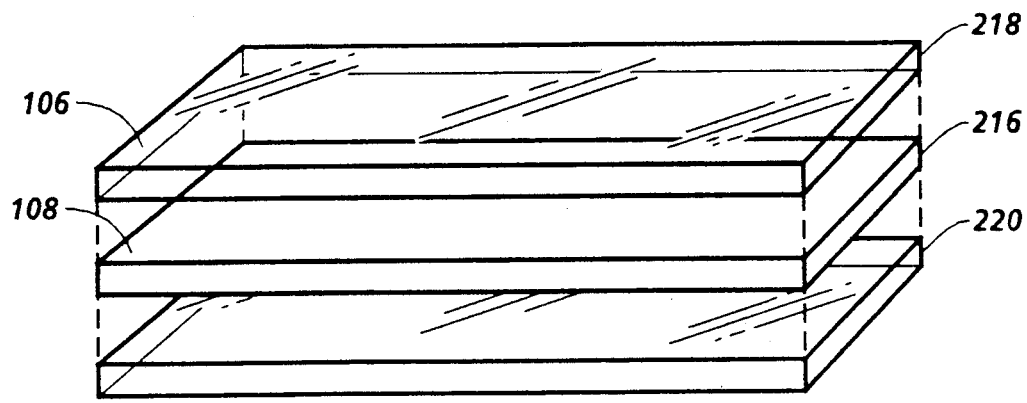

Light incident on second surface 108 must be diffused for the projected image to appear as if it were written on the first surface 106 itself. Thus, where first surface 106 and second surface 108 are two sides of a single sheet 210, as shown in FIG. 3a, the screen may be manufactured of a translucent material. Alternatively, second surface 108 may be of a roughened texture or may have a diffusing coating applied thereon or other treatment to give it a diffusing characteristic. As shown in FIG. 3b, first and second surfaces 106, 108 may be two sides of separate sheets of material or the like. In this case, first surface 106 of first sheet 212 will have the characteristics mentioned above, namely being of a smooth texture (nonporous) to allow marking (and erasing) thereon. Second sheet 214 will have at least one surface, namely second surface 108, capable of diffusing incident light. As with the embodiment of FIG. 3a, second sheet 214 may be of a translucent material, or second surface 108 may be of a roughened texture or may have a diffusing coating applied thereon or other treatment to give it a diffusing characteristic. Such an arrangement may be used in cases where the texture of both primary surfaces of the diffusing second sheet would interfere with writing directly thereon. FIG. 3c shows a third possible arrangement wherein a layer 216 of diffusing material, such as paper, plastic or similar film is sandwiched between first and second sheets 218 and 220. Here again, first surface 106 and second surface 108 will have the characteristics discussed above. Similarly, motivation for such an embodiment might be where the diffusing material is inappropriate for receiving markings thereon. In such an embodiment it will be important to maintain maximum optical transmission of layer 216 while retaining its diffusing characteristics. This may be accomplished, for example, by keeping layer 216 as thin as possible. Also, by keeping the respective layers of the various embodiments described above as close together as possible, any parallax problems may be minimized.

In addition to its diffusing characteristics, second surface 108 must be sufficiently nonreflective such that an image projected from a video projector will not be significantly reflected back at a video camera capturing the image of second surface 108. This requirement obviates any video feedback problems associated with the rear projection/imaging arrangement.

Given that light will be transmitted from first surface 106 to second surface 108, indicia imparted upon first surface 106, and any other object (e.g., part or all of a user) having sufficient opacity, will block such transmission. A video camera 112 positioned with its focus on second surface 108 will thus be capable of capturing (or imaging) the indicia on first surface 106. As a precondition to the ability of camera 112 to be able to capture the indicia on first surface 106, the ambient light falling on second surface 108 must be minimized. Also, the higher the contrast between the indicia and the background (that part of the screen not having indicia imparted thereon), the more clearly the imparted indicia may be captured by the camera for presentation to the other apparatus. The contrast between the indicia and the background will be a function primarily of the opacity of the indicia, the translucence of screen 104, and the intensity of the light incident upon the first surface 106. The above described dry erasable markers have varying degrees of opacity, which usually decreases with the age of the marker. The translucence of screen 104 will be limited by the need to diffuse light incident thereon (see below). However, it is possible to control and increase the contrast of the indicia by providing a backlight source (relative to the user) such as that shown at 114. That is, light source 114 may provide increased luminescence of the background, while the indicia remains essentially opaque.

Light source 114 serves also to improve the contrast of the image of a user provided by system 100. That is, when a user is positioned close to first surface 106, a shadow of the user will be cast upon that surface. That shadow will be viewable on second surface 108 much as the indicia on first surface 106 is viewable, and hence light source 114 may serve to enhance the contrast of the shadow of the user in the manner described above. However, there are several subtle points regarding the shadow of the user. First, as the user moves away from first surface 106 his shadow becomes more diffuse. As this occurs, the intensity of the contrast between the shadow and the background diminishes, and thus the image of the user dissolves into the background. This is desirable since it is primarily the activities of creating, using, and referring to marks on the screen that need to be clearly captured by camera 112. Furthermore, proximity to the screen is discernible from the clarity of the shadow. This conveys a three-dimensional quality to the shadow of the user. Second, light source 114 must have broad enough dispersion and be positioned such that the shadow of the user appears appropriately located and scaled. For example, light source 114 might be a single fixture oriented approximately coaxially with video camera 112 and have a sufficiently dispersed pattern so as to illuminate the entire screen in the absence of obstacles. Thus, portions of the user proximate the first surface 106 will appear as a relatively clear shadow with defined edges which will be captured by video camera 112. Third, while ambient lighting is required in order that the user's shadow not block out markings on the screen, a relatively low intensity of ambient lighting is needed to give the shadow some three dimensional qualities. Rather than simply having a black shadow on a white background, providing a proper ambient light intensity allows a degree of visual sense of how distant a user's hand, pointer, or the like is from the screen surface.

In order for projected images to appear to be written on screen 104 itself, a video projector 116 will be located on the same side of screen 104 as camera 112. Light in the form of a projected image from projector 116 incident on second surface 108 will be diffused so that the projected image appears as if it were written on the first surface 106. Projector 116 will be located and focussed such that it is capable of projecting an image onto substantially the entire second surface 108. Since camera 112 is positioned on the back side of screen 104 relative to the user, the camera will capture a left-right reversed optical image. Thus, to compensate for this reversal, video projector 116 is set to project in the front projection mode, even though it is positioned in the rear projection position.

We have determined through our studies that not only is the visual portion of collaborative work important, but the audio portion also forms a key aspect of the collaborative effort. A great amount of information is contained in the combination of gesture and explanation, which facilitates understanding of the work and intentions of the users. In order to utilize this aspect of collaboration, a full duplex audio connection, including an audio microphone 118 and audio speaker 120 are provided at a convenient location near the screen 104. (The provision of processing apparatus for input and output of the audio portion is well known, and will not be described herein.)

Each of camera 112 and projector 116 may be connected to an audio/video mixing resource 122. A single audio/video mixing resource 122 may be shared by each apparatus 102, or each apparatus may have its own audio/video mixing resource 122, each of which being interconnected for transferring audio and video data. The video images captured by camera 112 may be input to the mixing resource 122 along signal path 124. The audio images captured by microphone 118 may be input to the mixing resource along signal path 126. Resource 122 may distribute these video and audio images to the various other apparatus (not shown, but similar to apparatus 102) of system 100 along a signal path such as 128. Likewise, images captured from the video camera and audio microphone portions of the other apparatus may be input to the mixing resource 122 along signal path 130, which may in turn be distributed to projector 116 along signal path 132 and to speaker 120 along signal path 134. Signal paths 128 and 130 are shown as dashed lines to stress that they may represent both audio and video paths, and that there may be many such paths since any number of other apparatus similar to apparatus 102 may form a part of system 100, and be interconnected to allow remote collaborative work. It is to allow the interconnection of an arbitrary number of such apparatus that the video mixing resource 122 forms part of system 100.

Connected to mixing resource 122 may be audio/video storage apparatus 136, such as audio/video tape recorders, audio tape recorders, video hardcopy devices, still image recorders, etc. A single storage apparatus 136 may be connected to a central mixing resource 122, or in the case where each apparatus 102 includes its own mixing resource 122, each apparatus may have associated with it its own dedicated storage apparatus. Apparatus 136 may thus be used to create a record of the collaborative effort of the users which includes the markings and the gestures involved in making, using, and referring to the markings, as well as any audio supplementation to such making, using, and referring to the markings.

Also connected to mixing resource 122 may be audio/video presentation apparatus 138. Again, a single presentation apparatus 138 may be connected to a central mixing resource 122, or in the case where each apparatus 102 includes its own mixing resource 122, each apparatus may have associated with it its own dedicated presentation apparatus 138. The presentation apparatus 138 may be one of essentially two types of apparatus. First, are apparatus which may present images of previously recorded collaborative work, such as an audio/video tape player, audio tape player, etc. Second, are apparatus which present images not of previously recorded collaborative work, but rather images of information used to assist in the collaborative work process. Such apparatus include personal computers or work stations, video image generators, etc. The images that these apparatus present may include grids, scales or other frameworks for making charts, graphs of data, lists of data, illustrations, etc. The underlying purpose of either of these two types of presentation apparatus is to assist the collaborative work process by providing basic or supplementary images for projection onto screen 104.

Figure 4:
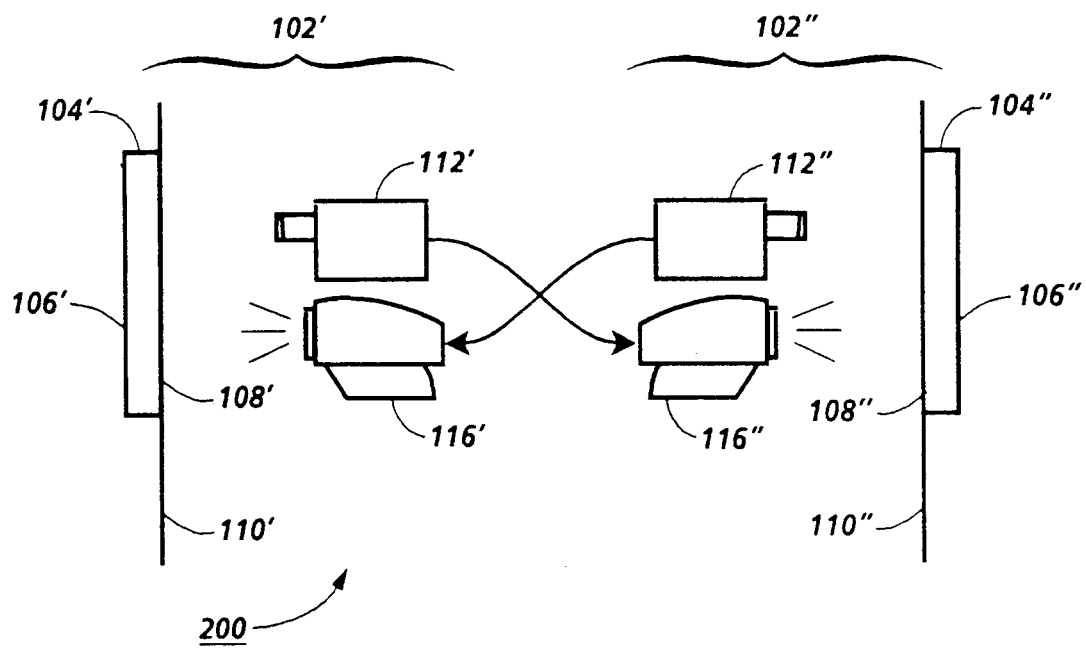
FIG. 4 shows an arrangement of an apparatus allowing remote interactive use of two writing surfaces, not including signal mixing, according to another aspect of the present invention.

In certain circumstances, it may be desirable to form a system, such as the system 200 shown in FIG. 4, which does not include a video mixing resource. Such a system will generally consist of two apparatus 102' and 102", whose components are numbered such that like components previously described with regard to FIG. 2 are similarly numbered in FIG. 4. (However, only those components necessary for a basic understanding of the arrangement of FIG. 4 are shown.) In this arrangement, the video camera 112' of apparatus 102' is connected to the video projector 116" of apparatus 102", and similarly the video camera 112" of apparatus 102" is connected to the video projector 116' of apparatus 102'. It is assumed that any signal processing (e.g., compression/decompression, transmission, filtering, etc.) is performed as required, the details of which are omitted as being beyond the scope of the present invention.

Figure 5:
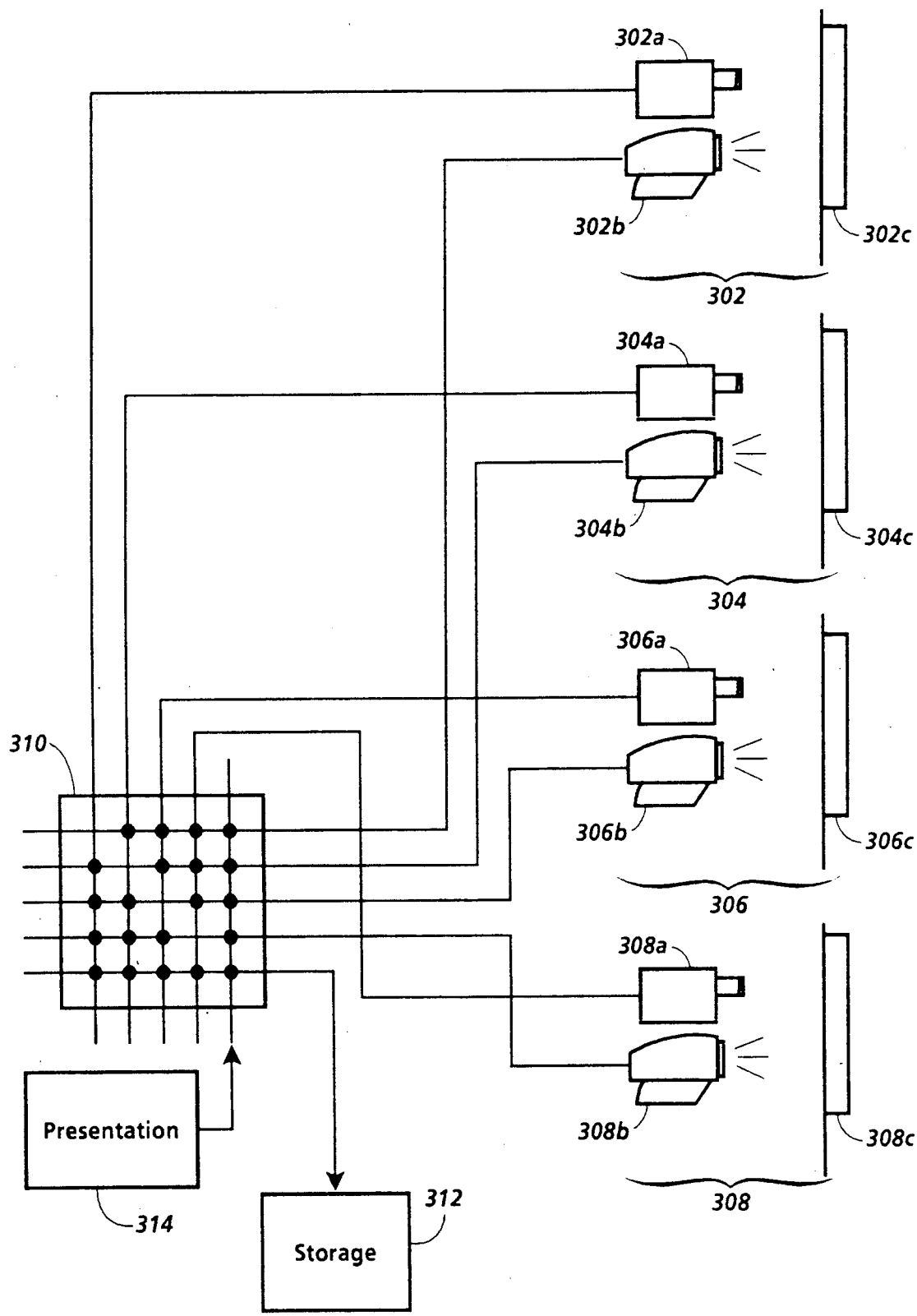
FIG. 5 shows another arrangement of an apparatus according to the present invention allowing remote interactive use of a plurality of writing surfaces in which the interconnections for signal mixing are shown.

FIG. 5 illustrates another possible arrangement of the present invention forming a complete system 300 including a central video/audio mixing resource. In FIG. 5, four apparatus 302, 304, 306, and 308, each essentially similar to apparatus 102 described above, are shown interconnected via a central mixing resource 310. Each apparatus includes a camera (labeled 302a, 304a, 306a, and 308a), a projector (302b, 304b, 306b, and 308b), and a screen (302c, 304c, 306c, and 308c), as described above. Mixing resource 310 interconnects the apparatus in the manner illustrated in FIG. 5. Specifically, each camera is assigned a vertical line and each projector is assigned a horizontal line. Connections are made at the intersections of the various lines where appropriate, as indicated by the dot over the intersection. The nature of this connection may be either analog mixing using standard video effects equipment or digital signal combination to provide enhanced mixing capabilities.

As will be apparent from FIG. 5, this interconnection scheme allows the output signal of a camera to be input to the projector of each apparatus. It will be noted that the aforementioned screen characteristics effectively prevent video feedback. However, use of such an apparatus where a user's own markings and shadow are projected back to his own screen may be quite awkward and difficult without proper alignment of the camera and projector. Such alignment may, in fact, be performed by sending a user's own marking back to his own screen. The user would make appropriately shaped figures, such as varying sized boxes, on various parts of his screen. The user's camera and/or projector would be positioned and adjusted such that the projected markings aligned with the actual markings. In this way, an arrangement wherein a camera is imaging a view of a monitor displaying that same camera's output, that would normally yield destructive video feedback, can be constructively used for system alignment.

Also illustrated in FIG. 5 are audio/video storage apparatus 312, similar to storage apparatus 136, and audio/video presentation apparatus 314, similar to presentation apparatus 138. The indicated connection scheme allows inputting to the storage apparatus 312 a mix of the individual signals being input to each projector. Likewise, the connection scheme allows outputting from the presentation apparatus 314 a selected image to each projector. It should be noted that the audio portion of each apparatus 302, 304, 306, and 308 may be mixed in a similar manner, or otherwise as appropriate to the particular application.

In general, to those skilled in the art to which this invention relates, many changes in construction and widely differing embodiments and applications of the present invention will suggest themselves without departing from its spirit and scope. As only a single example, a rear projection/imaging arrangement has been described herein. Without departing from the spirit and scope of the present invention, other arrangements, such as incorporation into the system described above of viewing stations having only audio and video projection capabilities (i.e., viewing rooms), are within the contemplation of the present invention. What is provided, however, is a system which conveys an image of a user and the gestures and process of creating and using marks, together with the marks themselves, which our research indicates are important elements of collaborative work. Provision of such is made in a convenient, simple to use manner not previously available, and which overcomes the disadvantages of related systems found in the art. Thus, the disclosures and descriptions herein are illustrative, and are not intended to be in any sense limiting.

What is claimed is:

1. An apparatus for remote interactive communication, comprising:

first and second writing/display screens, each writing/display screen having a first surface for receiving indicia imparted by a user thereupon and a second surface opposite said first surface for diffusing light incident thereupon;

a first video camera positioned to capture substantially only those images imparted on the first surface of the first writing/display screen by imaging the second surface of the first writing/display screen;

a second video camera positioned to capture substantially only those images imparted on the first surface of the second writing/display screen by imaging the second surface of the second writing/display screen;

a first video projector positioned to project an image onto the second surface of the first writing/display screen;

a second video projector positioned to project an image onto the second surface of the second writing/display screen; and means for interconnecting the first and second video cameras and video projectors such that an image of indicia imparted by a user upon the first surface of the first writing/display screen is detected by the first video camera and transmitted to the second video projector which projects the image from the first writing/display screen onto the second surface of the second writing/display screen and an image of indicia imparted by a user upon the first surface of the second writing/display screen is detected by the second video camera and transmitted to the first video projector which projects the image from the second writing/display screen onto the second surface of the first writing/display screen to thereby form an optical composite of the images on the first surfaces of the first and second writing/display screens.

2. The apparatus of claim 1, further including means for illuminating a user such that a shadow of the user is imparted onto the first surface of either the first or second writing/display screen when the user is proximate either first surface.

3. The apparatus of claim 1, wherein each said writing/display screen comprises a semitransparent body.

4. The apparatus of claim 1, further including means for capturing and presenting audio communication associated with each said first and second writing/display screens and interconnection means such that audio communication associated with said first writing/display screen is transmitted for presentation at said second writing/display screen and audio communication associated with said second writing/display screen is transmitted for presentation at said first writing/display screen.

5. The apparatus of claim 1, wherein said means for interconnecting the first and second video cameras and video projectors comprises mixing means for producing a composite of inputs from the first and second video cameras which may be projected by said video projectors.

6. The apparatus of claim 1, further including storage means connected to said first and second video cameras for storing the image of indicia imparted by a user and the shadow of the user imparted upon the first surface of both the first and second writing/display screens.

7. The apparatus of claim 1, further including presentation means connected to said first and second video projectors for presenting a selected image for projection upon the second surface of each of said first and second writing/display screens.

8. The apparatus of claim 7, wherein said presentation means includes means for presenting animated prerecorded collaborative work.

9. An apparatus for remote interactive communication, comprising:

first and second writing/display screens, each writing/display screen comprising a semitransparent body having a first surface for receiving indicia imparted by a user thereupon and a second surface opposite said first surface for diffusing light incident thereupon;

a first video camera positioned to capture substantially only those images imparted on the first surface of the first writing/display screen by imaging the second surface of the first writing/display screen;

a second video camera positioned to capture substantially only those images imparted on the first surface of the second writing/display screen by imaging the second surface of the second writing/display screen;

a first video projector positioned to project an image onto the second surface of the first writing/display screen;

a second video projector positioned to project an image onto the second surface of the second writing/display screen;

mixing means for producing a composite of inputs from the first and second video cameras which may be projected by said video projectors such that an image of indicia imparted by a user upon the first surface of the first writing/display screen captured by the first video camera and an image of indicia of imparted by a user upon the first surface of the second writing/display screen captured by the second video camera are combined to form the composite which is transmitted to both the first and second video projectors which project the composite onto the second surface of the first and second writing/display screens;

means for illuminating a user such that a shadow of the user is imparted onto the first surface of either the first or second writing/display screen when the user is proximate either first surface;

storage means connected to said mixing means for storing the composite of indicia imparted by a user and the shadow of the user imparted upon the first surface of both the first and second writing/display screens; and presentation means connected to said mixing means for presenting a selected image to said mixing means for transmission to the first and second projectors.

10. The apparatus of claim 9, wherein said presentation means includes means for presenting animated prerecorded collaborative work.

11. The apparatus of claim 9, further including means for capturing and presenting audio communication associated with each said first and second writing/display screens and interconnection means such that audio communication associated with said first writing/display screen is transmitted for presentation at said second writing/display screen and audio communication associated with said second writing/display screen is transmitted for presentation at said first writing/display screen.

12. An apparatus for remote interactive communication, comprising:

first and second writing/display screens, each writing/display screen comprising a semitransparent body having a first surface for receiving indicia imparted by a user thereupon and a second surface opposite said first surface for diffusing light incident thereupon;

a first video camera positioned to capture substantially only those images imparted on the first surface of the first writing/display screen by imaging the second surface of the first writing/display screen;

a second video camera positioned to capture substantially only those images imparted on the first surface of the second writing/display screen by imaging the second surface of the second writing/display screen;

a first video projector positioned to project an image onto the second surface of the first writing/display screen;

a second video projector positioned to project an image onto the second surface of the second writing/display screen;

mixing means for producing a composite of inputs from the first and second video cameras which may be projected by said video projectors such that an image of indicia imparted by a user upon the first surface of the first writing/display screen captured by the first video camera and an image of indicia of imparted by a user upon the first surface of the second writing/display screen captured by the second video camera are combined to form the composite which is transmitted to both the first and second video projectors which project the composite onto the second surface of the first and second writing/display screens;

means for illuminating a user such that a shadow of the user is imparted onto the first surface of either the first or second writing/display screen when the user is proximate either first surface;

storage means connected to said mixing means for storing the composite of indicia imparted by a user and the shadow of the user imparted upon the first surface of both the first and second writing/display screens;

presentation means connected to said mixing means for presenting a selected image to said mixing means for transmission to the first and second projectors; and means for capturing and presenting audio communication associated with each said first and second writing/display screens connected to said mixing means such that audio communication associated with said first writing/display screen is transmitted for presentation at said second writing/display screen is transmitted for presentation at said second writing/display screen and audio communication associated with said second writing/display screen is transmitted for presentation at said first writing/display screen.

* * * * *